(12) United States Patent
Speijers

(10) Patent No.: US 12,442,146 B2
(45) Date of Patent: Oct. 14, 2025

(54) METHOD AND DEVICE FOR CONTROLLING THE WATER LEVEL IN GROUND

(71) Applicant: ALTOP PATENTS II B.V., Beek (NL)

(72) Inventor: Sam Speijers, Middelaar (NL)

(73) Assignee: ALTOP PATENTS II B.V., Beek (NL)

( * ) Notice: Subject to any disclaimer, the term of this patent is extended or adjusted under 35 U.S.C. 154(b) by 943 days.

(21) Appl. No.: 17/594,083

(22) PCT Filed: Apr. 1, 2020

(86) PCT No.: PCT/EP2020/059223
§ 371 (c)(1),
(2) Date: Oct. 1, 2021

(87) PCT Pub. No.: WO2020/201335
PCT Pub. Date: Oct. 8, 2020

(65) Prior Publication Data
US 2022/0341102 A1      Oct. 27, 2022

(30) Foreign Application Priority Data

Apr. 3, 2019   (NL) .................................... 2022856

(51) Int. Cl.
*E01C 13/02*    (2006.01)
*B01D 29/11*    (2006.01)
(Continued)

(52) U.S. Cl.
CPC .............. *E01C 13/02* (2013.01); *B01D 29/11* (2013.01); *B01D 29/605* (2013.01);
(Continued)

(58) Field of Classification Search
CPC ....... E01C 13/02; B01D 29/11; B01D 29/605; B01D 29/606; B01D 29/661; B01D 35/02;
(Continued)

(56) References Cited

U.S. PATENT DOCUMENTS 5,163,781 A    11/1992   Husu
5,944,444 A     8/1999   Motz et al.
(Continued)

FOREIGN PATENT DOCUMENTS

DE    102009023321 A1    12/2010
DE    202014001564 U1     5/2014
(Continued)

OTHER PUBLICATIONS

International Search Report and Written Opinion in corresponding International Patent Application No. PCT/EP2020/059223 dated May 20, 2020.

*Primary Examiner* — Thuan D Dang
(74) *Attorney, Agent, or Firm* — Steven M. Koehler; Westman, Champlin & Koehler, P.A.

(57) ABSTRACT

A method of controlling the water level in ground in which drainage pipes have been laid, said method comprising: a) providing the ground with water passing through the drainage pipes in a natural way and/or by active intervention using a control system, b) creating an underpressure or overpressure of water and/or air in the drainage pipes by means of the control system, thereby causing water or air to be extracted from or supplied to the soil via the drainage pipes, and c) programming the programmable control system in such a manner that the control system determines the points in time, durations, volumes and/or order of the water supply to the drainage pipes and of the generation of an underpressure or overpressure of water and/or air.

19 Claims, 1 Drawing Sheet

(51) Int. Cl.
   *B01D 29/60*   (2006.01)
   *B01D 29/66*   (2006.01)
   *B01D 35/02*   (2006.01)
   *C02F 1/00*    (2023.01)

(52) U.S. Cl.
   CPC ......... *B01D 29/606* (2013.01); *B01D 29/661* (2013.01); *B01D 35/02* (2013.01); *C02F 1/001* (2013.01); *C02F 1/008* (2013.01); *C02F 2209/03* (2013.01); *C02F 2209/42* (2013.01); *C02F 2301/063* (2013.01); *C02F 2301/066* (2013.01); *C02F 2303/16* (2013.01)

(58) Field of Classification Search
   CPC ...... C02F 1/001; C02F 1/008; C02F 2209/03; C02F 2209/42; C02F 2301/063; C02F 2301/066; C02F 2303/16
   See application file for complete search history.

(56) References Cited

U.S. PATENT DOCUMENTS

| | | |
|---|---|---|
| 2005/0031416 A1 | 2/2005 | Bishop, Jr. |
| 2006/0127183 A1 | 6/2006 | Bishop, Jr. |

FOREIGN PATENT DOCUMENTS

| | | |
|---|---|---|
| GB | 1347965 A | 2/1974 |
| NL | 1016903 C2 | 6/2002 |
| WO | 89/12719 A1 | 12/1989 |

METHOD AND DEVICE FOR CONTROLLING THE WATER LEVEL IN GROUND

CROSS-REFERENCE TO RELATED APPLICATIONS

This application is a Section 371 National Stage Application of International Application No. PCT/EP2020/059223, filed Apr. 1, 2020 and published as WO 2020/201335 A1 on Oct. 8, 2020, and further claims priority to Netherlands Application Ser. No. 2022856, filed Apr. 3, 2019.

BACKGROUND

The present invention relates to a method of controlling the water level in ground in which drainage pipes have been laid.

The present invention also relates to a device for carrying out the method and to a computer program by means of which the method is carried out.

Such a method and device are known from NL-1016903. The known method comprises the following steps: a) providing drainage pipes whose inlet openings are connected to the control system with water in a natural way and/or by active intervention using the control system, and b) creating an underpressure by means of the control system such that it causes water to be extracted from the drainage pipes and the soil. Said underpressure is achieved by means of water, making use of the "law of communicating vessels". Waterlogging of the surface of the soil, in particular of a riding arena, is thus counteracted.

A drawback of the known method resides in the slowness with which the water level is brought to the desired level. The slow rate at which drying and moistening of the soil surface take place and the slow rate of recovery after heavy rainfall and/or frost or the slow rate at which snow is removed from the soil surface influence the financially responsible use of fields in general and sports fields for trials or sports in particular, for example, in equestrian sports, the riding arena for dressage or jumping.

SUMMARY

An advantage of the disclosed method and the device resides in that pre-programmed cycles of, for example, controlled draining or aerating of the soil using drainage pipes can be carried out in a satisfactory manner. For example, the control system can be used to achieve an air pressure in the drainage pipes which is so low that, in a short amount of time, the accumulated water can be actively extracted from said drainage pipes, and from the soil in which they are situated as well as from the soil surface. In this manner the required water level in the soil is achieved more rapidly than would be possible using communicating vessels, in particular after or in the case of a rapid change in weather conditions.

To make sure that the rapidly extracted amount of water ultimately does not lead to clogging of the filter material provided at the periphery of the drainage pipes, a preferred method generates an overpressure of water and/or air in the drainage pipes, such that air and/or water passing through filter material surrounding the drainage pipes removes particles causing clogging of the filter material from said filter material.

The applied overpressure brings about an air flow and/or water flow back into the drainage pipes at a relatively high speed. As a result, the contamination particles are rinsed from the filter material, in particular the periphery thereof and the surrounding soil. The inventor has determined that the particles responsible in particular for clogging the material are the fine particles which, by virtue of this process step, disappear back in the soil and under the influence of gravity gradually sink deeper into the soil, in particular between the underlying coarser silt and soil particles.

An embodiment of the method includes regularly or irregularly using the control system to generate an underpressure or overpressure of water or air in a buffer vessel to which the drainage pipes are connected.

This has the advantage that the finer particles rinsed from the filter material sink so deep into the soil that they can no longer cause clogging of the filter material. Eventually, after repeatedly performing these steps, the layer between the soil surface and the drainage pipes will comprise a gradually increasing share of better water-permeable coarse particles.

Furthermore, the use of said buffer vessel has the advantage that the vessel does not have to be buried, instead it can be placed overground, if necessary on a vehicle so that it can be moved. The buffer vessel is used to make the connections with the buried drainage pipes and, if necessary, with surface water for supply and drainage of water.

In embodiments of the method and the device in which the buffer vessel is used, the programmable control system creates a condition with regard to in particular water pressure and/or air pressure which enables the required steps of the corresponding method to be carried out.

To control and regulate all relevant condition variables, air pressure and water pressure in the drainage pipes, a next embodiment of the device various water level sensors and an internal air pressure sensor are provided in the buffer vessel which are connected to the control member in order to operate the necessary pumps and to influence the pressure condition in the buffer vessel to carry out one or more of the above mentioned steps and/or combinations of steps. In order to co-facilitate this in practice, the necessary controllable valves connected to the control system are provided at the various water and/or air supply and drain connections of the buffer vessel.

Further detailed, possible embodiments elucidated in the other claims are mentioned, together with the associated advantages, in the following description.

BRIEF DESCRIPTION OF THE DRAWINGS

The method and device will now be explained in greater detail with reference to the figures mentioned below, in which corresponding elements are indicated by means of the same reference numerals.

In the figures.

DETAILED DESCRIPTION

Figure 1:
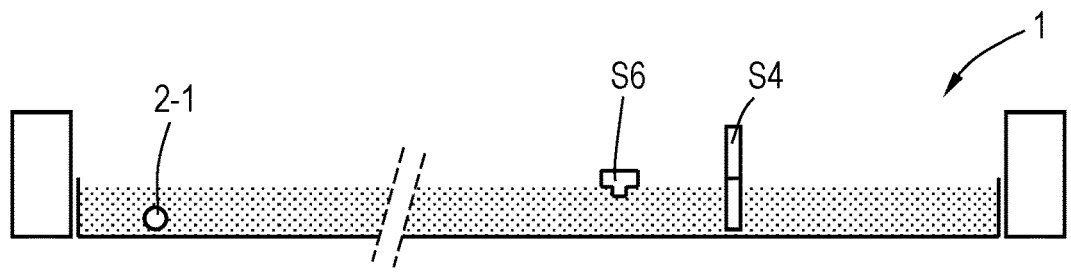
FIG. 1 shows soil, in this case soil of a riding arena in which drainage pipes have been placed.
Figure 2:
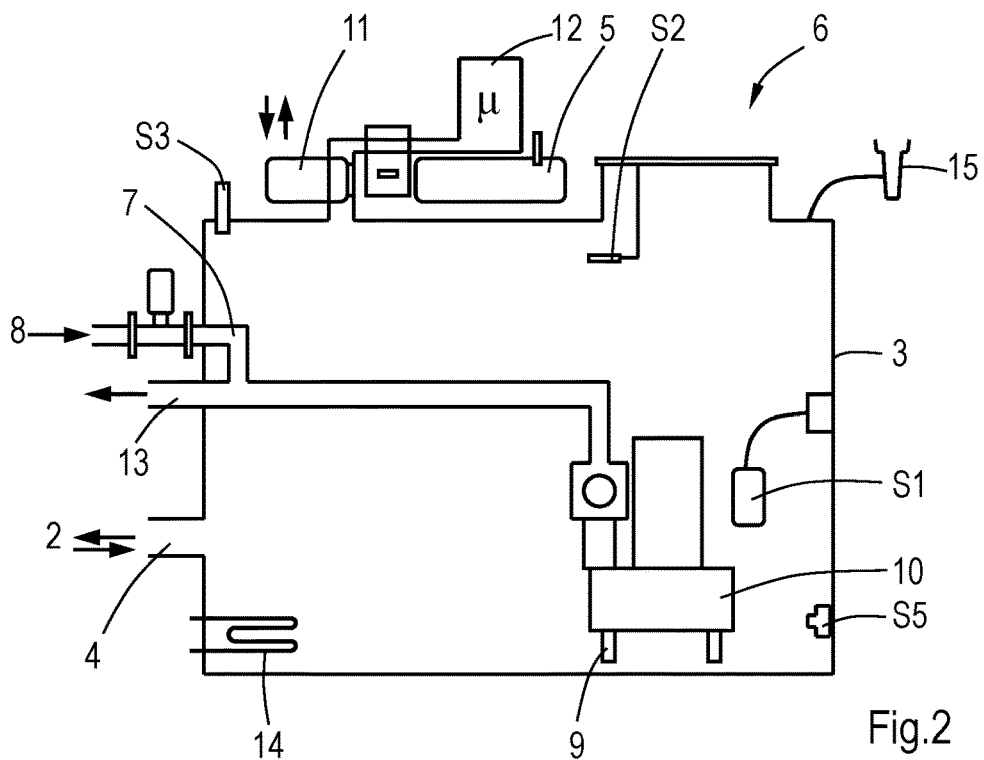
FIG. 2 shows a preferred embodiment of a device connected to the drainage pipes of FIG. 1, said device being used to influence the water balance in the soil.
Figure 3:
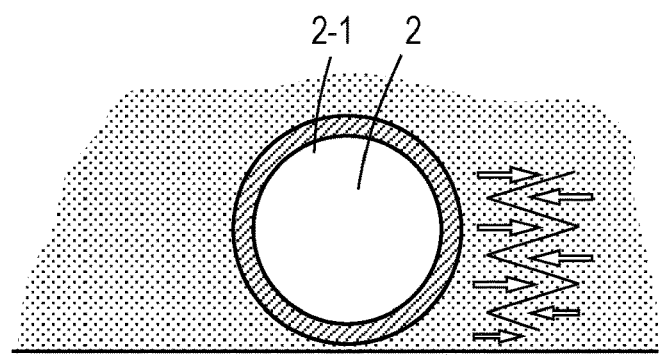
FIG. 3 is a diagrammatic sectional view of a drainage pipe surrounded at the periphery by filter material from which fine soil particles move downwards in a zigzag way when the method is carried out.

FIG. 1 shows a riding arena 1, known per se, which allows the method of influencing the water content thereof to be applied, said method in general being applicable to a soil layer. The soil may be earth, such as for agricultural applications, an athletics track or a sports field, or it may be a dike or water defense the water level of which must be influenced. The water-permeable soil in the riding arena 1—(for brevity the description of this figure is limited thereto)— comprises inter alia a porous type of rock, such as lava stone, sand, i.e., often a mixture of drainage sand and fine sand and, if necessary, fiber material such as synthetic fibers. The surface of said soil in the riding arena should be firm but not too hard, and to achieve this it should contain sufficient but not too much water because it would otherwise be unsuitable for sports activities, such as equestrian sports. In trotting and racing on the one hand and dressage on the other hand, certain rules apply regarding the soil to achieve a safe and responsible exercise of sporting activities for human beings in general and riders in particular, particularly as regards riding arenas which are often situated outdoors. Unpredictable weather conditions may lead to postponement or even cancellation of the events concerned because the water balance of the soil and the soil surface cannot be put into order sufficiently quickly. Interconnected drainage pipes 2 are located in the riding arena 1, approximately 35 to 40 cm below the surface of the ground. Said pipes, which may have an overall length of several kilometers, meet in a central point at an airtight buffer vessel 3. The drainage pipes 2 comprise a water-permeable, often porous, outer wall which is surrounded by a water-permeable filter material 2-1, indicated by hatching lines. The buffer vessel 3 is shown in FIG. 2, and a cross-sectional view of a drainage pipe 2 surrounded by filter material 2-1 is shown in FIG. 3.

A method of controlling the water level in soil in which the drainage pipes 2 have been laid is proposed, said method comprising the following steps:
  a) providing the soil with water passing through the drainage pipes 2 in a natural way and/or by active intervention using a control system 5; 12,
  b) creating an underpressure or overpressure of water and/or air in the drainage pipes 2 by means of the control system 5; 12, thereby causing water or air to be extracted from or supplied to the soil via the drainage pipes 2, and
  c) programming the programmable control system 12 in such a manner that the control system determines the points in time, durations, volumes and/or order of the water supply to the drainage pipes 2 and of the generation of an underpressure or overpressure of water and/or air.

In addition to the advantages explained hereinabove, a further advantage of the method resides in that also when the soil is used for a comparatively long period of time, it is not subject to silting up and the filter material 2-1 does not become clogged or silted up, because each time the method is carried out, small stone particles, sand particles, dust particles or fiber particles, which normally cause clogging of this material, are removed from the filter material 2-1. This applies particularly if the steps consisting of successively applying an overpressure and an underpressure in the pipes 2 are carried out a number of times.

Depending on the composition and the layer thicknesses of the various soil layers, said steps are preferably carried out regularly and for certain periods of time at overpressure or underpressure values controlled by the control system 5, 12 in order to achieve a required optimum result. Each time, in particular fine particles caught in the filter material 2-1 and coarser particles which are mostly present only on the outside of the material, are rinsed from the filter material 2-1 by applying an overpressure or underpressure to air or water, respectively, or to a mixture of both. As a result, gradually space is created in the soil, around the outside of the filter material 2-1, and said particles end up in this space after which they move downwards in a zigzag way (see FIG. 3), in this case to the bottom of the riding arena 1. In the long run, the greatest part of the silt particles will have sunk, so that clogging of the filter material 2-1 of the drainage pipes 2 is less likely irrespective of the forward and backward flow directions of water and/or air. By virtue thereof, using comparatively low air pressures at the feed-through openings 4 or in the buffer vessel 3, substantial amounts of water, but air also, can be advantageously extracted from or supplied to the soil and the ground in the riding arena 1.

In practice, the underpressure of air in step b) lies in the range between 200 mBar and 800 mBar, in particular between 250 mBar and 600 mBar, more particularly between 300 mBar and 475 mBar, and preferably is approximately 400 mBar. In the latter case, the air movement is approximately 1000 m3 per hour, which corresponds to a water extraction of approximately 45 m3 per hour. Any puddles on the surface of a riding arena caused by a downpour can be removed rapidly, often in less than 1.5 hours. By equipping the control system 5 with a programmable control member 12, which is often controlled by a microprocessor in, likely soil and weather scenarios can be pre-installed in order to be prepared, not only for the type of soil on which the jumping or dressage sport takes place, but also for locally different weather conditions which may or may not have been forecast.

The device 6 by means of which this can be advantageously achieved is shown in FIG. 2; it comprises:
  a controllable water pump 10 the suction side 7 of which is connected to a water reservoir 8 and the pressure side 9 is connected to drainage pipes 2 in the ground;
  an additional controllable pump 11 which is connected to the drainage pipes 2, and which is arranged for extracting water and/or air from or pressing water and/or air into the drainage pipes 2, in a manner which will be explained hereinbelow, using inter alia the buffer vessel 3;
  a programmable control system 12, which is connected to each one of the above-mentioned pumps 10, 11, and which is programmed to determine the points in time, durations, volumes and/or order, under said conditions, of the water supply to the drainage pipes 2 and the generation of an underpressure or overpressure of water and air.

In principle, a separate pump could be used for each of the above-described pump activities. That is to say, a water pump could be used to move water and an air pump could be used to move air, wherein "to move" is to be understood to mean suction and pressing activities. Hereinafter, this description emphasizes on a preferred embodiment comprising only one water pump and only one air pump to carry out the required water and air displacements. Particularly preferably, said water and air displacements are carried out using an embodiment, which will be explained in greater detail hereinafter, in which the buffer vessel 3 is used.

For this purpose, the device 6 shown comprises, in this embodiment, the buffer vessel 3 connected to the drainage pipes 2 and to said pumps 10, 11. In this case, the submersible pump 10 is provided in the buffer vessel 3, and the suction pump, in the form of the air pump 11, is connected to the buffer vessel 3. The arrangement of the control system 12 is such that, by the programmed control of both pumps 10, 11, one or more of the above-mentioned steps and/or combinations of steps can be carried out under said programmed conditions regarding: points in tune, durations, volumes and/or orders, as mentioned hereinabove.

The buffer vessel 3 normally sealed off from the open air in an airtight manner is also provided with water level sensors SI, S2 and an air pressure sensor S3, which are all connected to the control system 12. The above-mentioned pumps 10, 11 are controlled, so that the internal pressure condition in the buffer vessel 3 is influenced also based on information supplied by the sensors SI, S2 and S3 in order to carry out one or more of the above-mentioned required steps and/or combination of steps. If the vertical position of the buffer vessel 3 is not at an equal horizontal level as the connection of the drainage pipes 2 to the buffer vessel 3, then, in the area of the pipes 2, a level sensor connected to the control system 12 and serving as a water level sensor S4 will be used. The sensor S4 provides information to the system 12 if the water level in the pipes 2 is low. As a result, water is allowed to enter the pipes 2, which is supplied, if necessary, by pumping by one of the pumps 10, 11. The above-mentioned conditions can be part of a subtle control strategy of the system 12 by additionally taking into account, inter glia, the current direct sunlight, the temperature of the water in the buffer vessel 3, the external air temperature and, for example, the time of day and/or the actual evaporation of water at the ground surface. The control strategy may be self learning, so that the required water level in the soil is maintained within a certain bandwidth. The known control activities, i.e., the individual PID activities, can be adapted, so that the eventually continuously varying, required water level or the associated, required water quantity in the soil is followed as closely as possible under all circumstances.

In the normal operating range, the water level in the buffer vessel 3 is between the positions of the sensors SI and S2, and, if required, the filter material 2-1 is rinsed with water and kept clean.

If the water level in the buffer vessel 3 measured or detected by sensor SI is below the normal operating range, the control system 5 as a whole operates such that dependent upon the step being carried out, water originating from the reservoir 8 is admitted on the suction side 7 via valves controlled by the control system 5 or via pump 10, or the operation of the air pump 11 creates an underpressure in the buffer vessel 3, causing air and/or in particular water to be drawn in from the drainage pipes 2, or the operation of the air pump 11 creates an overpressure in the buffer vessel 3, causing only air to be blown to the drainage pipes 2 via the valves controlled by the control system 5, resulting in said particles being removed by air from the filter material 2-1 of the pipes 2.

If the water level in the buffer vessel 3 measured or detected by sensor S2 is above the normal operating range, then, dependent upon the step or, if necessary intermediate step, being carried out, the excess water is removed from said buffer vessel. This is achieved by reverse operation of the submersible pump 10 via the water outlet 13, which is also valve-controlled, or the operation of the air pump 11 creates an overpressure above the water level in the buffer vessel 3, causing water to be pressed into the drainage pipes 2 via the water outlet 13, resulting in said particles being removed from the filter material 2-1 by water. In practice, the overpressure of the air in the buffer vessel 3 then ranges between approximately 100-300 mBar.

In practice, it has been found useful to provide the device 6 with heating means diagrammatically shown in FIG. 2, which are active in the buffer vessel 3, and which are used to heat the outgoing air and/or outgoing water flowing to the drainage pipes 2. For this purpose, means 14 are used, which are controlled by means of the control system 5, 12 and by means of temperature sensors S5 and/or S6 connected thereto. These means are applied in particular if the temperature sensors S5 and/or S6, which are mounted inside and/or outside the buffer vessel 3, give reason to assume that there is a real possibility of freezing of the surface of the soil. In anticipation thereof, the soil can be (pre-) heated temporarily or permanently.

Natural rainfall can be measured by providing an external rain gauge 15, which is made to supply an electrical measure of the actual amount of falling rain to the control system 12. A special program is subsequently run automatically on this control system, if necessary before any falling rain can be observed on the surface of the ground, in order to anticipate the eventually required amount of water to be withdrawn from the drainage pipes 2. This has a favorable effect on the condition of the soil and its quick recovery after a hefty shower.

The invention claimed is:

1. A device for controlling a water level in ground in which drainage pipes have been laid, the device comprising:
a controllable water pump having a suction side connectable to a water reservoir and a pressure side connectable to drainage pipes in the ground;
an additional controllable pump which is connectable to the drainage pipes configured to extract water and/or air from or pressing water and/or air into the drainage pipes;
a programmable control system which is connected to each one of the controllable water pump and the additional controllable pump, the control system being configured to determine points in time, durations, volumes and/or order of the water supply to the drainage pipes and of the generation of an underpressure or overpressure of water or air in the drainage pipes;
a buffer vessel connected to the drainage pipes, and the controllable water pump and the additional controllable pump are connected to said buffer vessel; and
water level sensors and air pressure sensors provided in the buffer vessel and connected to the control system, the control system configured to control the controllable water pump and the additional controllable pump and influence the pressure condition in the buffer vessel based on the water level sensors and/or the air pressure sensors.

2. The device according to claim 1, wherein the control system is configured to generate an overpressure of water and/or air in the drainage pipes, such that air and/or water passing through filter material surrounding the drainage pipes removes particles causing clogging of the filter material from said filter material.

3. The device according to claim 1, wherein the control system is configured to regularly or irregularly generate an underpressure or overpressure of water or air in the buffer vessel to which the drainage pipes are connected.

4. The device according to claim 1, wherein the control system is configured to generate overpressure in a range between 200 mBar and 800 mBar.

5. The device according to claim 1, wherein the control system is configured to generate underpressure of air so as to withdraw approximately 1000 m$^3$ of air per hour from the drainage pipes.

6. The device according to claim 1, wherein the water pump is a suction pump and/or a pressure pump, and the additional controllable pump is an air suction pump and/or an air pressure pump.

7. A device for controlling a water level in ground in which drainage pipes have been laid, the device comprising:
- a controllable water pump having a suction side connectable to a water reservoir and a pressure side connectable to drainage pipes in the ground;
- an additional controllable pump which is connectable to the drainage pipes configured to extract water and/or air from or pressing water and/or air into the drainage pipes;
- a programmable control system which is connected to each one of the controllable water pump and the additional controllable pump, the control system being configured to determine points in time, durations, volumes and/or order of the water supply to the drainage pipes and of the generation of an underpressure or overpressure of water or air in the drainage pipes;
- a buffer vessel connected to the drainage pipes, and the controllable water pump and the additional controllable pump are connected to said buffer vessel; and
- wherein the additional controllable pump comprises an air pump which is connected to the buffer vessel and which is configured to press water and/or air from the buffer vessel into the drainage pipes or extract it therefrom by influencing the overpressure or underpressure of air in the buffer vessel.

8. The device according to claim 7, and further comprising, water level sensors and air pressure sensors provided in the buffer vessel and connected to the control system, the control system configured to control the controllable water pump and the additional controllable pump and influence the pressure condition in the buffer vessel based on the water level sensors and/or the air pressure sensors.

9. The device according to claim 7, wherein the air pump is configured to generate an overpressure of 100-300 mBar in the buffer vessel.

10. The device according to claim 7, wherein the control system is configured such that based on a water level in the buffer vessel being below a normal operating range, air is pressed into the drainage pipes or withdrawn therefrom by the air pump.

11. The device according to claim 7, wherein the control system is configured to generate an overpressure of water and/or air in the drainage pipes, such that air and/or water passing through filter material surrounding the drainage pipes removes particles causing clogging of the filter material from said filter material.

12. The device according to claim 7, wherein the control system is configured to regularly or irregularly generate an underpressure or overpressure of water or air in the buffer vessel to which the drainage pipes are connected.

13. The device according to claim 7, wherein the control system is configured to generate overpressure in a range between 200 mBar and 800 mBar.

14. The device according to claim 7, wherein the control system is configured to generate underpressure of air so as to withdraw approximately 1000 $m^3$ of air per hour from the drainage pipes.

15. A device for controlling a water level in ground in which drainage pipes have been laid, the device comprising:
- a controllable water pump having a suction side connectable to a water reservoir and a pressure side connectable to drainage pipes in the ground;
- an additional controllable pump which is connectable to the drainage pipes configured to extract water and/or air from or pressing water and/or air into the drainage pipes;
- a programmable control system which is connected to each one of the controllable water pump and the additional controllable pump, the control system being configured to determine points in time, durations, volumes and/or order of the water supply to the drainage pipes and of the generation of an underpressure or overpressure of water or air in the drainage pipes;
- a buffer vessel connected to the drainage pipes, and the controllable water pump and the additional controllable pump are connected to said buffer vessel; and
- a heater provided in the buffer vessel and connected to the control system, said heater configured to heat outgoing water and/or outgoing air flowing to the drainage pipes.

16. The device according to claim 15, wherein the control system is configured to generate an overpressure of water and/or air in the drainage pipes, such that air and/or water passing through filter material surrounding the drainage pipes removes particles causing clogging of the filter material from said filter material.

17. The device according to claim 15, wherein the control system is configured to regularly or irregularly generate an underpressure or overpressure of water or air in the buffer vessel to which the drainage pipes are connected.

18. The device according to claim 15, wherein the control system is configured to generate overpressure in a range between 200 mBar and 800 mBar.

19. The device according to claim 15, wherein the control system is configured to generate underpressure of air so as to withdraw approximately 1000 $m^3$ of air per hour from the drainage pipes.

* * * * *